(12) United States Patent
Shen et al.

(10) Patent No.: US 9,681,083 B2
(45) Date of Patent: Jun. 13, 2017

(54) METHOD AND SYSTEM TO DETECT A LIGHT-EMITTING DIODE

(71) Applicant: OMNIVISION TECHNOLOGIES, INC., Santa Clara, CA (US)

(72) Inventors: Jie Shen, Fremont, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 54 days.

(21) Appl. No.: 14/738,744

(22) Filed: Jun. 12, 2015

(65) Prior Publication Data

US 2016/0366356 A1 Dec. 15, 2016

(51) Int. Cl.
*H04N 5/378* (2011.01)
*H04N 5/235* (2006.01)
*H04N 5/353* (2011.01)
*H04N 5/355* (2011.01)

(52) U.S. Cl.
CPC ........... *H04N 5/378* (2013.01); *H04N 5/2357* (2013.01); *H04N 5/3532* (2013.01); *H04N 5/35581* (2013.01)

(58) Field of Classification Search
CPC .... H04N 5/378; H04N 5/2357; H04N 5/3532; H04N 5/35581
USPC ....................................................... 348/226.1
See application file for complete search history.

(56) References Cited

U.S. PATENT DOCUMENTS

| | | | | |
|---|---|---|---|---|
| 6,476,715 B1* | 11/2002 | Bromer | .................. | B60R 25/00 340/425.5 |
| 2011/0255786 A1* | 10/2011 | Hunter | ................. | H04N 5/2357 382/190 |
| 2011/0292240 A1* | 12/2011 | Sekiguchi | ............ | H04N 5/2357 348/226.1 |
| 2014/0333825 A1* | 11/2014 | Nakagawara | ........ | H04N 5/2357 348/362 |
| 2016/0044223 A1* | 2/2016 | Harada | ................. | H04N 5/2353 348/207.11 |
| 2016/0073001 A1* | 3/2016 | Nakagawara | ........ | H04N 5/2357 348/226.1 |

* cited by examiner

*Primary Examiner* — Nhan T Tran
(74) *Attorney, Agent, or Firm* — Blakely Sokoloff Taylor & Zafman LLP

(57) ABSTRACT

A method of detecting light-emitting diode (LED) light starts with a control circuitry generating a shutter signal that is transmitted to a pixel array to control image acquisition by the pixel array and to establish a set exposure time. The readout circuitry may then read out the image data from the pixel array that includes reading out the image data from a plurality of successive and overlapped frames having the set exposure time. The set exposure time may be the same for each of the frames. The successive and overlapped frames may be interlaced frames. Other embodiments are also described.

23 Claims, 5 Drawing Sheets

METHOD AND SYSTEM TO DETECT A LIGHT-EMITTING DIODE

FIELD

An example of the present invention relates generally to image sensors. More specifically, examples of the present invention are related to methods and systems to detect a light-emitting diode (LED) such that a flickerless image capture may be performed.

BACKGROUND

High speed image sensors have been widely used in many applications in different fields including the automotive field, the machine vision field, and the field of professional video photography. Some applications in these fields require the detection and capture of LED lights, which has proven to be difficult. Given that the LED pulse is narrow (e.g., 1 millisecond (ms)), the conventional high speed image sensors may either miss the LED light or capture an image that includes a flicker.

BRIEF DESCRIPTION OF THE DRAWINGS

The embodiments of the invention are illustrated by way of example and not by way of limitation in the figures of the accompanying drawings in which like references indicate similar elements throughout the various views unless otherwise specified. It should be noted that references to "an" or "one" embodiment of the invention in this disclosure are not necessarily to the same embodiment, and they mean at least one. In the drawings.

Figure 1:
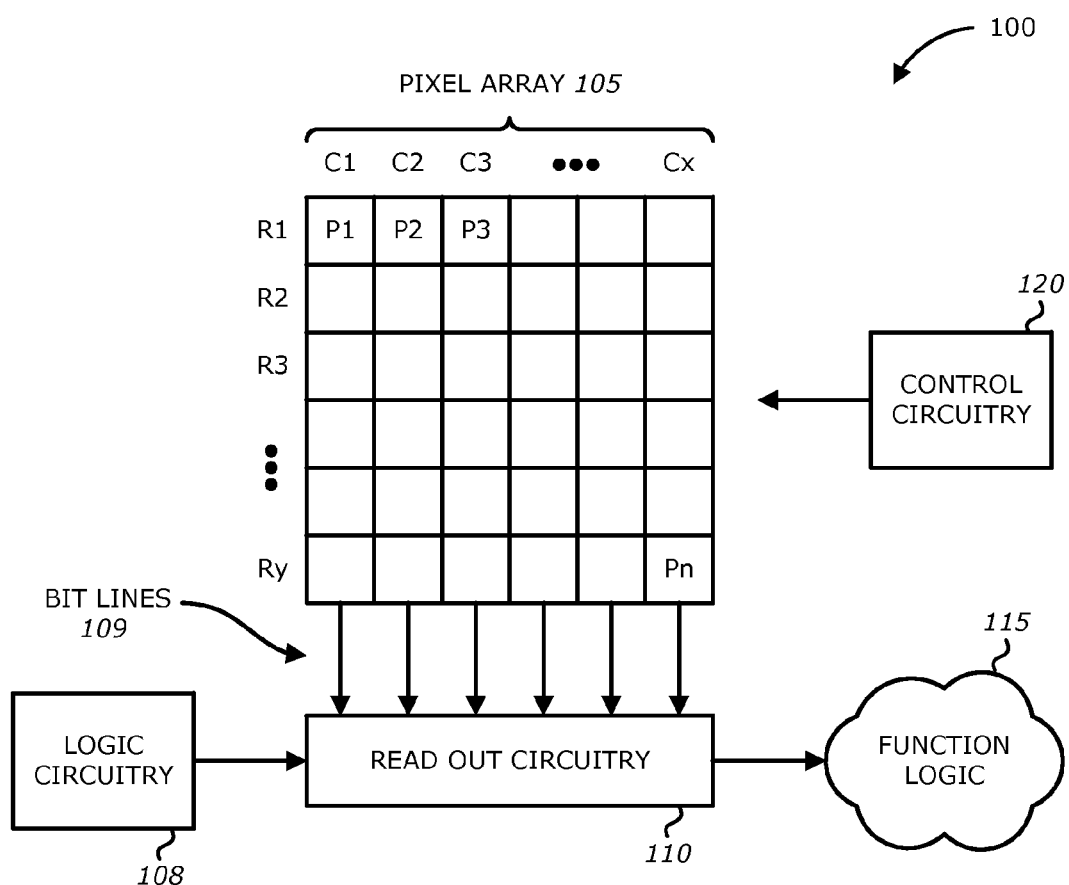
FIG. 1 is a block diagram illustrating an example imaging system that detects a LED in accordance to one embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. However, it is understood that embodiments of the invention may be practiced without these specific details. In other instances, well-known circuits, structures, and techniques have not been shown to avoid obscuring the understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Particular features, structures or characteristics may be included in an integrated circuit, an electronic circuit, a combinatorial logic circuit, or other suitable components that provide the described functionality.

FIG. 1 is a block diagram illustrating an example imaging system 100 that detects and captures a LED in accordance to one embodiment of the invention. Imaging system 100 may be a complementary metal-oxide-semiconductor ("CMOS") image sensor. Since LED pulses are narrow (e.g., 1 ms), the conventional imaging systems may miss the LED light or capture an image that includes a flicker due to the LED light. In one embodiment, imaging system 100 detects LED by using successive and overlapped frames instead of a single frame to ensure that imaging system 100 is continuously capturing frames. For instance, the successive and overlapped frames may be interlaced frames. In one embodiment, each of the successive and overlapped frames may have the same exposure time and the minimum overlap time of the frames is a sum of the LED pulse width (Tled) and a frame transfer time (Tft). The LED pulse width (Tled) may be 1 ms and the frame transfer time (Tft) may be 1 ms. In one embodiment, a high frame transfer rate (1/Tft) is preferred to minimize the affection by the background. In this embodiment, a hybrid stack chip may be used. The hybrid stack chip may have a frame transfer rate (1/Tft) of 1000 frames per second (fps), a 60 fps input-output (IO) and 1 frame buffer.

As shown in the depicted example in FIG. 1, imaging system 100 includes pixel array 105 coupled to control circuitry 120 and readout circuitry 110, which is coupled to function logic 115 and logic control 108.

The illustrated embodiment of pixel array 105 is a two-dimensional ("2D") array of imaging sensors or pixel cells (e.g., pixel cells P1, P2, . . . , Pn). In one example, each pixel cell is a CMOS imaging pixel. As illustrated, each pixel cell is arranged into a row (e.g., rows R1 to Ry) and a column (e.g., columns C1 to Cx) to acquire image data of a person, place or object, etc., which can then be used to render an image of the person, place or object, etc.

In one example, after each pixel has acquired its image data or image charge, the image data is read out by readout circuitry 110 through readout column bit lines 109 and then transferred to function logic 115. In one embodiment, a logic circuitry 108 can control readout circuitry 110 and output image data to function logic 115. In various examples, readout circuitry 110 may include amplification circuitry (not illustrated), analog-to-digital conversion (ADC) circuitry 220, or otherwise. Function logic 115 may simply store the image data or even manipulate the image data by applying post image effects (e.g., crop, rotate, remove red eye, adjust brightness, adjust contrast, or otherwise). In one example, readout circuitry 110 may read out a row of image data at a time along readout column lines (illustrated) or may read out the image data using a variety of other techniques (not illustrated), such as a serial read out or a full parallel read out of all pixels simultaneously.

In one example, control circuitry 120 is coupled to pixel array 105 to control operational characteristics of pixel array 105. For example, control circuitry 120 may generate a shutter signal for controlling image acquisition. In one example, the shutter signal is a global shutter signal for simultaneously enabling all pixels within pixel array 105 to simultaneously capture their respective image data during a single acquisition window. In another example, the shutter signal is a rolling shutter signal such that each row, column, or group of pixels is sequentially enabled during consecutive acquisition windows. The shutter signal may also establish an exposure time, which is the length of time that the shutter remains open. In one embodiment, the exposure time is set to be the same for each of the frames.

Figure 2:
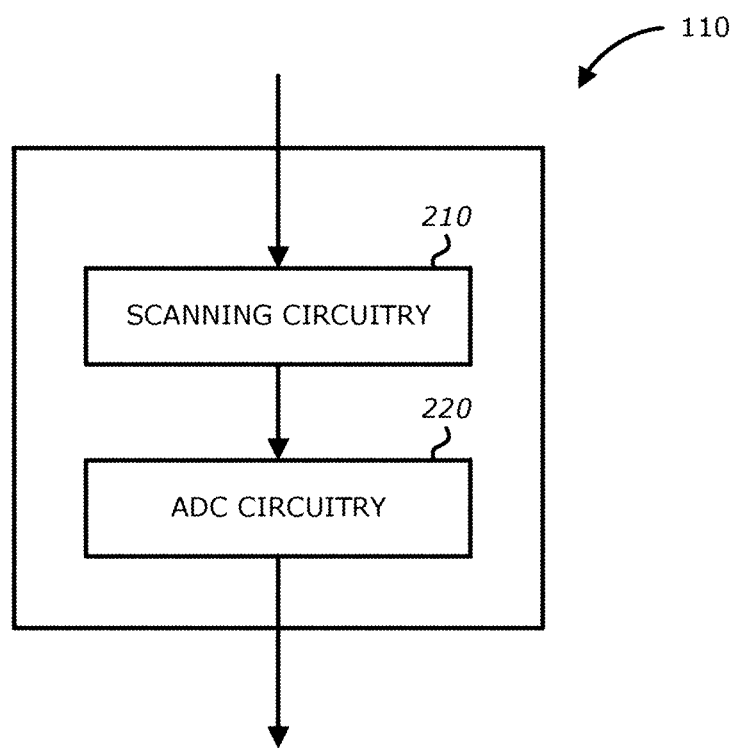
FIG. 2 is a block diagram illustrating the details of the readout circuitry in FIG. 1 in accordance to one embodiment of the invention.
Figure 3:
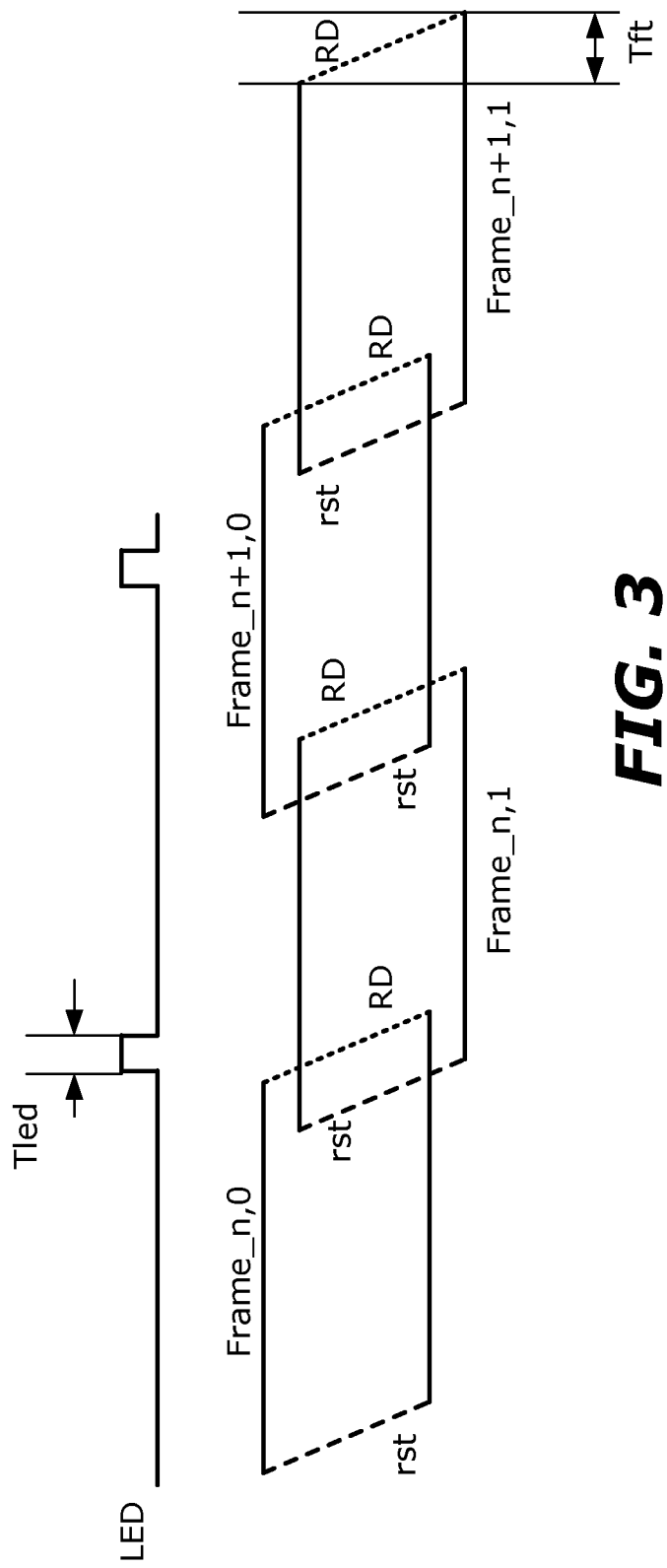
FIG. 3 is a timing diagram illustrating the capturing of the LED light in accordance to one embodiment of the invention.

FIG. 2 is a block diagram illustrating the details of readout circuitry 110 of an imaging system 100 in FIG. 1 in accordance to one embodiment of the invention. As shown in FIG. 2, readout circuitry 110 may include scanning circuit 210, and an ADC circuitry 220. Scanning circuit 210 may include amplification circuitry, selection circuitry (e.g., multiplexers), etc. to readout a row of image data at a time along readout column bit lines 109 or may readout the image data using a variety of other techniques, such as a serial readout or a full parallel readout of all pixels simultaneously. ADC circuitry 220 may convert each of the image data from the scanning circuit 210 from analog to digital. In one embodiment, readout circuitry 110 reads out image data from pixel array that includes reading out the image data from two or more successive and overlapped frames having a set exposure time. In other words, the set exposure time is the same for each of the frames. In one embodiment, the two or more successive and overlapped frames are interlaced frames. For the interlaced frames, readout circuitry 110 may read out the even rows of the odd numbered interlaced frames and read out the odd rows of the even numbered interlace frames. Similarly, readout circuitry 110 may also read out the odd rows of the odd numbered interlaced frames and read out the even rows of the even numbered interlaced frames. As shown in FIG. 3, the timing diagram illustrates the capturing of the LED light in accordance to one embodiment of the invention. In FIG. 3, the LED light is captured completely by (Frame_n,1) and (Frame_n+1,0), where the odd rows of (Frame_n,1) are read out and the even rows of (Frame_n+1,0) are read out. In one embodiment, each of the successive and overlapped frames may have the same exposure time and the minimum exposure time overlap between two or more successive and overlapped frames is a sum of the LED pulse width (Tled) and a frame transfer time (Tft). The LED pulse width (Tled) may be 1 ms and the frame transfer time (Tft) may be 1 ms. In one embodiment, a high frame transfer time (Tft) is preferred.

Figure 4:
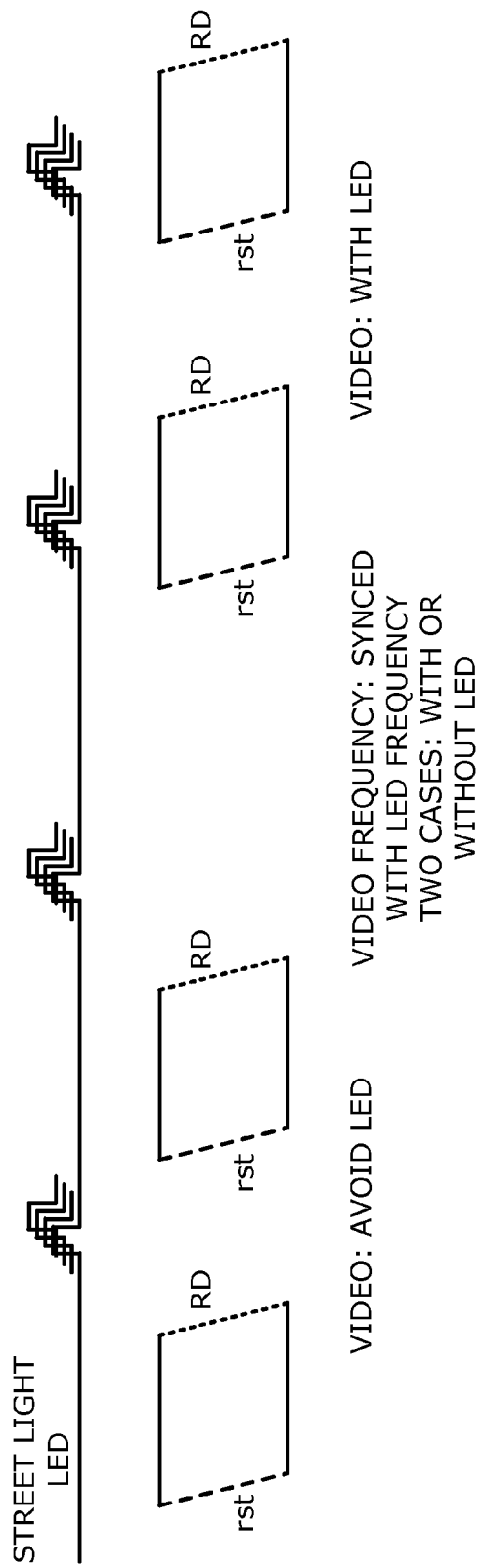
FIG. 4 is a timing diagram illustrating synching video frequency with a streetlight LED frequency in accordance to one embodiment of the invention.

As discussed above, function logic 115 may simply store the image data or even manipulate the image data by applying post image effects. In one embodiment, function logic 115 further receives the image data readout from readout circuitry 110 and determines whether the LED light is captured based on the readout of image data. In order to capture a flickerless image, function logic 115 may calculate a frequency of the LED light based on a determination of the number of times the LED light is captured and an identification of the frames in which the LED light is captured. Function logic 115 may then synchronize imaging system 100 with the calculated frequency of the LED light. In one embodiment, it is preferred that the image frames per second (fps) and the LED frequency has a small skew. FIG. 4 is a timing diagram illustrating synching video frequency with a streetlight LED frequency in accordance to one embodiment of the invention. On the left side of the timing diagram in FIG. 4, a video avoids the LED light pulses in that the frames are not synchronized with the streetlight LED frequency. For instance, the light may flicker during the non-exposure time of any of the rows of an image sensor in a rolling shutter image sensor. On the right side of the timing diagram in FIG. 4, once function logic 115 calculates the LED frequency and synchronizes the video frequency with the streetlight LED, the video frames are able to capture a flickerless image of the streetlight LED light. In one embodiment, the streetlight LED may sync with AC power with some offset. In one embodiment, function logic 115 in imaging system 100 may periodically perform LED detection.

Figure 5:
FIG. 5 is a timing diagram illustrating the LED communication between automobiles in accordance to one embodiment of the invention.

Imaging system 100 may also be used for LED communication between automobiles. FIG. 5 is a timing diagram illustrating the LED communication between automobiles in accordance to one embodiment of the invention. As shown in FIG. 5, the LED timing diagram in one transaction may include a plurality of header bits 510, data bits 520 and a plurality of footer bits 530. In one embodiment, function logic may identify multiple automobiles based on the detected LED from the image data, and perform LED communication for the identified automobiles. In this embodiment, multiple-to-one (M:1) communication may be performed.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 6:
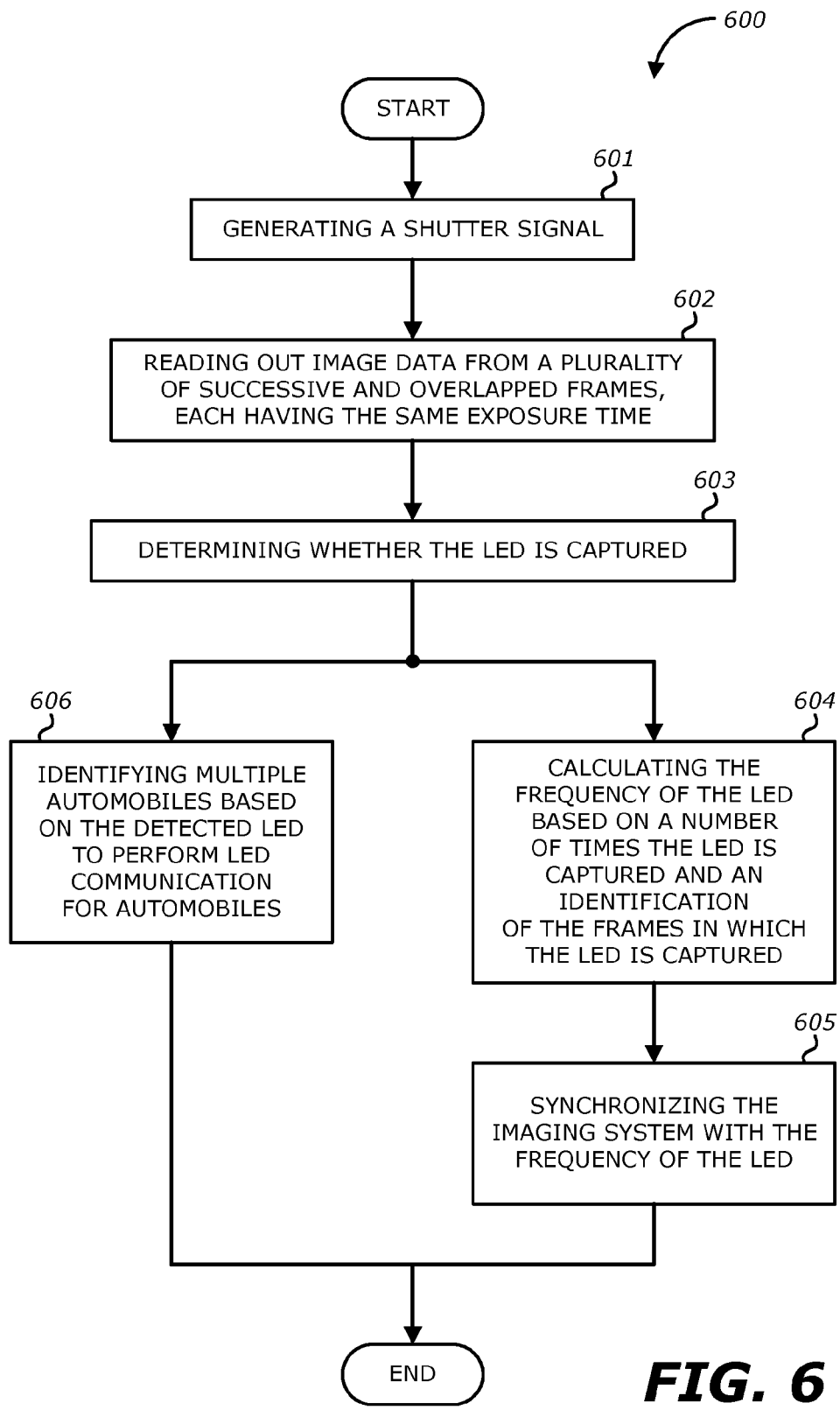
FIG. 6 is a flowchart illustrating a method of detecting a LED in accordance to one embodiment of the invention.

FIG. 6 is a flowchart illustrating a method 600 of detecting a LED in accordance to one embodiment of the invention. Method or process 600 starts at block 601 with control circuitry 120 generating a shutter signal that is transmitted to pixel array 105 to control image acquisition by pixel array 105 and to establish a set exposure time. The shutter signal may be a global shutter signal that enables all of the pixels in pixel array 105 simultaneously. The shutter signal may also enable all of the pixels in pixel array 105 to simultaneously capture image data during a single acquisition window. At block 602, readout circuitry 110 reads out image data from pixel array 105, which includes reading out the image data from a plurality of successive and overlapped frames having the set exposure time. The set exposure time may be the same for each of the frames. In one embodiment, the successive and overlapped frames are interlaced frames. In this embodiment, reading out the image data from the frames includes readout circuitry 110 reading out the even rows of odd numbered frames and reading out the odd rows of the even numbered frames, or vice versa. The successive and overlapped frames may overlap by a minimum exposure overlap time. This minimum overlap time may be the sum of (a) a LED pulse width (Tled) and (b) a frame transfer time (Tft). In one embodiment, control circuitry 120, pixel array 105, and readout circuitry 110 are included in an imaging system that is a hybrid stack chip having a higher frame transfer time. At block 603, function logic 115 determining whether the LED is captured based on the readout from readout circuitry 110. To capture a flickerless image of the LED, at block 604, function logic 115 calculates the frequency of the LED based on a number of times the LED is captured and an identification of the frames in which the LED is captured and at block 605, function logic 115 synchronizes the imaging system 100 with the frequency of the LED. To enable LED communication, at block 606, function logic 115 identifies multiple automobiles based on the detected LED to perform LED communication for automobiles.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of detecting a light emitting diode (LED) by an imaging system comprising:
    generating a shutter signal by a control circuitry that is transmitted to a pixel array to control image acquisition by the pixel array and to establish a set exposure time; and
    reading out by a readout circuitry image data from the pixel array that includes reading out the image data from a plurality of successive and overlapped frames having the set exposure time, wherein the set exposure time is the same for each of the frames,
    wherein the successive and overlapped frames overlap by a minimum overlap time, wherein the minimum overlap time is a sum of (i) a light emitting diode (LED) pulse width and (i) a frame transfer time.

2. The method of claim 1, wherein the shutter signal is a global shutter signal enabling all of the pixels in the pixel array simultaneously.

3. The method of claim 1, wherein the plurality of successive and overlapped frames are interlaced frames.

4. The method of claim 3, wherein reading out by the readout circuitry image data from the frames comprises:
    reading out by the readout circuitry even rows of odd numbered frames; and
    reading out by the readout circuitry odd rows of even numbered frames.

5. The method of claim 3, wherein reading out by the readout circuitry image data from the frames comprises:
    reading out by the readout circuitry odd rows of odd numbered frames; and
    reading out by the readout circuitry even rows of even numbered frames.

6. The method of claim 1, wherein the imaging system that is a hybrid stack chip, wherein the hybrid stack chip has a higher frame transfer rate than a non-hybrid stack chip.

7. The method of claim 1, further comprising:
    determining by a function logic whether the LED is captured based on the readout from the readout circuitry.

8. The method of claim 7, further comprising:
    calculating a frequency of the LED based on a number of times the LED is captured and an identification of frames in which the LED is captured; and
    synchronizing the image sensor with the frequency of the LED.

9. The method of claim 7, further comprising:
    identifying multiple automobiles based on the detected LED to perform LED communication for automobiles.

10. A method of detecting a light emitting diode (LED) by an imaging system comprising:
    simultaneously enabling all pixels within a pixel array to simultaneously capture image data during a single acquisition window; and
    reading out the image data from the pixel array that includes reading out the image data from a plurality of successive and interlaced frames having a same exposure time,
    wherein the successive and interlaced frames overlap by a minimum overlap time, wherein the minimum overlap time is a sum of (i) a light emitting diode (LED) pulse width and (i) a frame transfer time.

11. The method of claim 10, further comprising:
    generating a shutter signal by a control circuitry that is transmitted to the pixel array to control image acquisition by the pixel array, wherein the shutter signal is a global shutter signal.

12. The method of claim 10, wherein reading out the image data from the successive and interlaced frames comprises:
    reading out by a readout circuitry even numbered rows of a first frame; and
    reading out by the readout circuitry odd numbered rows of a second frame, wherein the first and the second frames are successive and interlaced.

13. The method of claim 10, wherein the imaging system that is a hybrid stack chip, wherein the hybrid stack chip has a higher frame transfer rate than a non-hybrid stack chip.

14. The method of claim 10, further comprising:
    determining by a function logic whether the LED is captured based on the readout from the readout circuitry.

15. The method of claim 14, further comprising:
    calculating a frequency of the LED based on a number of times the LED is captured and an identification of frames in which the LED is captured; and
    synchronizing the imaging system with the frequency of the LED.

16. The method of claim 15, further comprising:
    identifying multiple automobiles based on the detected LED to perform LED communication for automobiles.

17. An imaging system to detect a light emitting diode (LED) comprising:
    a pixel array for acquiring image data, the pixel array including a plurality of rows and columns; and
    a readout circuitry coupled to the pixel array to readout image data from the pixel array that includes reading out the image data from a plurality of successive and interlaced frames having a same exposure time, wherein the successive and interlaced frames overlap by a minimum overlap time, wherein the minimum overlap time is a sum of (i) a light emitting diode (LED) pulse width and (i) a frame transfer time.

18. The imaging system of claim 17, further comprising:
a control circuitry to generate and transmit a shutter signal to a pixel array to control image acquisition by the pixel array and to establish the exposure time, wherein the shutter signal is a global shutter signal.

19. The imaging system of claim 17, wherein reading out the image data from the successive and interlaced frames comprises:
reading out even numbered rows of a first frame; and
reading out odd numbered rows of a second frame, wherein the first and the second frames are successive and interlaced.

20. The imaging system of claim 17, further comprising:
a function logic to receive the image data readout from the readout circuitry and to determine whether the LED is captured based on the readout of image data.

21. The imaging system of claim 20, wherein the function logic further to
calculate a frequency of the LED based on a number of times the LED is captured and identification of frames in which the LED is captured, and
synchronize the imaging system with the frequency of the LED.

22. The imaging system of claim 21, wherein the function logic further to
identify multiple automobiles based on the detected LED to perform LED communication for automobiles.

23. The imaging system of claim 17, further comprising:
a logic circuitry to control the readout circuitry and output image data from the readout circuitry to function logic, and
wherein the readout circuitry comprises scanning circuitry to select rows of pixels from the pixel array to be readout, and analog-to-digital conversion (ADC) circuitry to convert each of the image data from analog to digital.

\* \* \* \* \*